Patented May 17, 1949

2,470,585

UNITED STATES PATENT OFFICE 2,470,585

PREPARATION OF 2-THIOUREIDO-4-METHYL THIAZOLE HYDROCHLORIDE

Russell L. Sperry, Glendora, Calif., assignor to American Cyanamid Company, New York, N. Y., a corporation of Maine No Drawing. Application December 6, 1946, Serial No. 714,651

3 Claims. (Cl. 260—302)

The present invention relates to the hydrochloric acid addition product of 2-thioureido-4-methyl thiazole and to a method of preparing the same.

The invention is particularly concerned with the preparation of that material from dithiobiuret and chloroacetone.

Dithiobiuret may be prepared according to the method disclosed in U. S. Patent No. 2,371,112.

Example

A solution of 18.5 grams (0.2 mol) of chloroacetone in 50 cc. of acetone was added slowly to a stirred solution of 13.5 grams (0.1 mol) of dithiobiuret in 150 cc. of acetone at room temperature. No exothermic reaction occurred. The solution was slowly warmed to reflux temperature and refluxed for two hours. A small amount of a colorless product was precipitated. The slurry was cooled to 0° C. and the insoluble material filtered and air dried. The dried product, which weighed 7 grams and had a melting point of 195–197° C., was three times recrystallized from methanol. The purified product melted at 207–209° C. The acetone filtrate was evaporated to dryness, the residue slurried in a small amount of methanol, filtered, washed with methanol and air dried. Thirteen additional grams of the product were obtained or a total yield of approximately 95.7%. The product was identified as 2-thioureido-4-methyl thiazole hydrochloride.

This material is useful as an intermediate and has insecticidal properties.

While the invention has been described with particular reference to specific embodiments, it is to be understood that it is not to be limited thereto but is to be construed broadly and restricted solely by the scope of the appended claims.

I claim:

1. The hydrochloric acid addition product of 2-thioureido-4-methyl thiazole.

2. A method of making 2-thioureido-4-methyl thiazole hydrochloride which comprises refluxing dithiobiuret with chloroacetone in a mutual inert solvent until a reaction occurs, and recovering 2-thioureido-4-methyl thiazole hydrochloride therefrom.

3. The method of claim 2 in which the mutual solvent is acetone.

RUSSELL L. SPERRY.

No references cited.